United States Patent
Hasegawa et al.

(10) Patent No.: US 7,134,538 B2
(45) Date of Patent: Nov. 14, 2006

(54) VEHICLE TAKE-OFF CONTROL APPARATUS AND METHOD

(75) Inventors: Yoshio Hasegawa, Chiryuu (JP); Tooru Matsubara, Susono (JP); Tadayuki Nagai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 10/880,526

(22) Filed: Jul. 1, 2004

(65) Prior Publication Data

US 2005/0020403 A1     Jan. 27, 2005

(30) Foreign Application Priority Data

Jul. 22, 2003     (JP)     ............................. 2003-199888

(51) Int. Cl.
*B60W 10/10*     (2006.01)
*B60W 10/18*     (2006.01)
*F16H 59/54*     (2006.01)

(52) U.S. Cl. ...................................... 192/220.1; 477/93
(58) Field of Classification Search ................. 192/220, 192/220.1; 477/93, 114
See application file for complete search history.

(56) References Cited

U.S. PATENT DOCUMENTS 5,052,531 A * 10/1991 Bota ........................ 192/219.1

2004/0231951 A1 * 11/2004 Hasegawa et al. .......... 192/220

FOREIGN PATENT DOCUMENTS

| DE | 197 31 979 A1 | 1/1998 |
| DE | 101 60 584 A1 | 6/2002 |
| DE | 102 12 320 A1 | 9/2002 |
| JP | 10-196782 | 7/1998 |
| JP | 11230327 A * | 8/1999 |

* cited by examiner

*Primary Examiner*—Richard M. Lorence
(74) *Attorney, Agent, or Firm*—Oblon, Spivak, McClelland, Maier & Neustadt, P.C.

(57) ABSTRACT

A take-off control apparatus and method is provided for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. A braking state of the vehicle is detected, and completion of cancellation of the neutral control is determined based on the detected braking state.

28 Claims, 6 Drawing Sheets

FIG. 2

|     | C1 | C2 | C3 | C4 | B1 | B2 | B3 | B4 | F0 | F1 | F2 | F3 |
|-----|----|----|----|----|----|----|----|----|----|----|----|----|
| P   |    |    |    |    |    |    |    |    |    |    |    |    |
| R   |    |    | ○  |    | ◎  |    |    | ○  |    | ○  |    |    |
| N   |    |    |    |    |    |    |    |    |    |    |    |    |
| 1th | ○  |    |    | ◎  |    |    |    | ◎  | ○  |    |    | ○  |
| 2nd | ○  |    |    | ◎  |    | ◎  | ○  |    | ○  | ○  | ○  |    |
| 3rd | ○  |    | ○  | ◎  | ◎  |    | △  |    | ○  | ○  |    |    |
| 4th | ○  | ○  | △  | ◎  |    |    | △  |    | ○  |    |    |    |
| 5th | △  | ○  | ○  |    | ○  |    | △  |    |    |    |    |    |
| 6th | △  | ○  |    |    | △  | ○  | △  |    |    |    |    |    |

○ ENGAGED
◎ ENGAGED WHEN ENGINE BRAKE IS APPLIED
△ ENGAGED BUT ENGAGEMENT IS NOT RELATED TO POWER TRANSMISSION

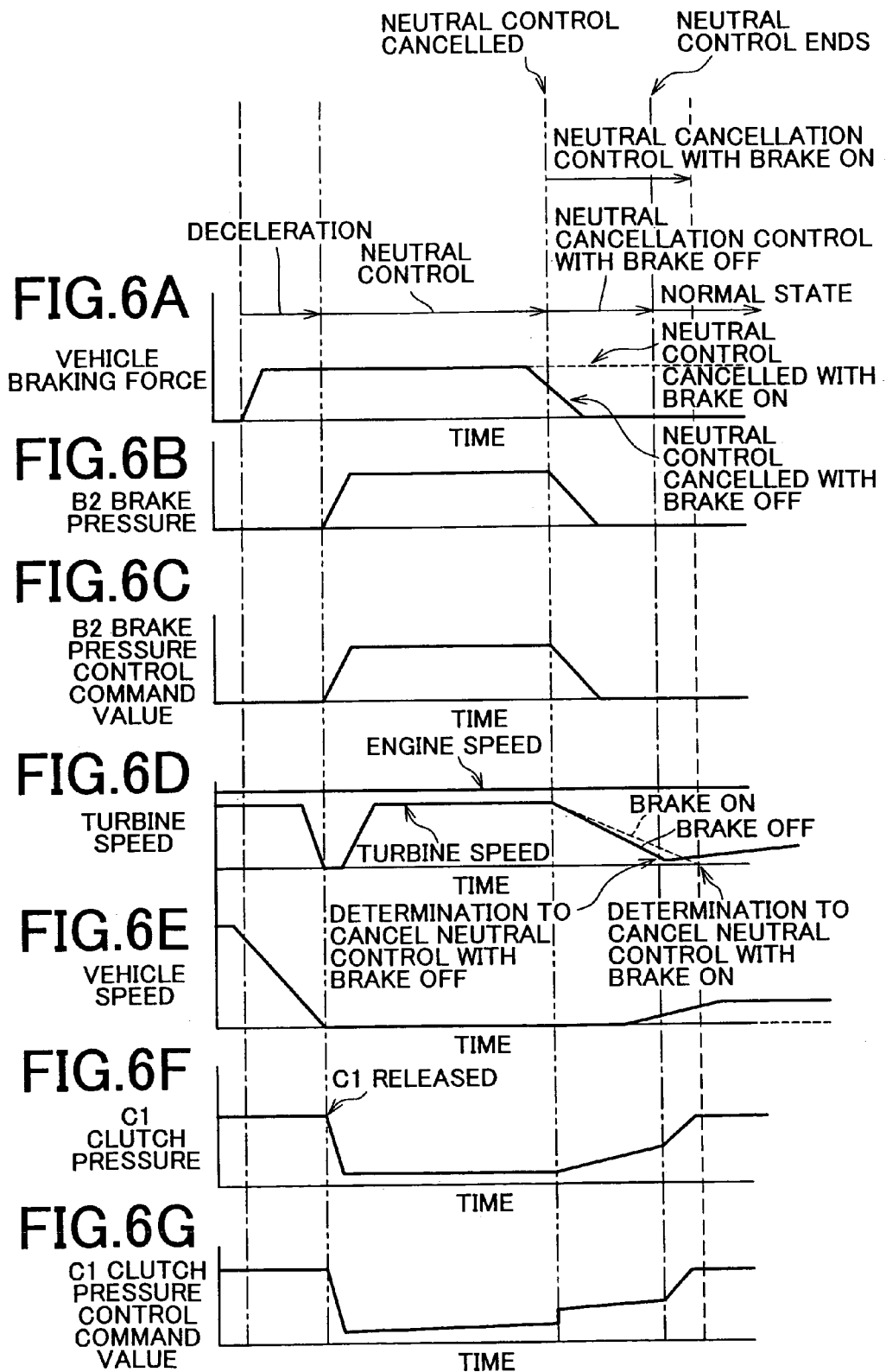

VEHICLE TAKE-OFF CONTROL APPARATUS AND METHOD

INCORPORATION BY REFERENCE

The disclosure of Japanese Patent Application No. 2003-199888 filed on Jul. 22, 2003, including the specification, drawings and abstract is incorporated herein by reference in its entirety.

BACKGROUND OF THE INVENTION

1. Field of the Invention

The invention generally relates to a take-off control apparatus and method for a vehicle equipped with an automatic transmission. More particularly, the invention relates to a take-off control apparatus and method for a vehicle, which executes a neutral control.

2. Description of the Related Art

An automatic transmission mounted in a vehicle is connected to an engine via a fluid coupling such as a torque converter provided in the automatic transmission, and includes a gear change mechanism that provides a plurality of power transmission paths. This automatic transmission is structured so as to automatically switch the power transmission path, i.e., the gear ratio (drive speed), based on the accelerator opening amount and the vehicle speed, for example. A vehicle having an automatic transmission is typically provided with a shift lever which is operated by a driver into any one of various shift positions (such as REVERSE, NEUTRAL, DRIVE). Automatic shift control is performed when the shift lever is in one of these shift positions (usually in a drive position or forward-drive range).

When a vehicle having this type of automatic transmission is stopped with the shift lever in a position corresponding to a forward-drive range, such as DRIVE, driving force from the idling engine is transmitted to the transmission via the torque converter and then to the wheels, resulting in a phenomenon known as "creeping." Creeping is extremely useful under certain conditions. For example, it facilitates smooth take-off of a vehicle when starting from a standstill on an incline. When the driver wants a vehicle that is stationary on a flat road to remain in one spot, however, creeping is unnecessary and must be suppressed by operating the brake. That is, the brake is used to suppress the creeping force from the engine, and the fuel efficiency of the engine decreases by a corresponding amount.

To improve fuel efficiency, therefore, it has been proposed to put a transmission that is in the forward-drive range into a neutral state, including a semi-neutral state, that resembles NEUTRAL, while still in the forward-drive range and the vehicle is being held stationary by the brake pedal being depressed so as to operate the brake and the accelerator being almost completely closed.

Many of these kinds of so-called neutral control technologies and technologies for controlling a brake of a vehicle during the transition from a stationary state to a take-off state are known.

JP(A) 10-196782 discloses a creep prevention device with hill hold for an automatic transmission, which cancels a creep prevention control (i.e., neutral control) and hill hold control at an appropriate timing and in such a manner that shock is reduced. This creep prevention device is used with an automatic transmission that inputs rotation of an engine via a fluid power transmitting device and changes the rate and/or direction of that rotation as appropriate according to a speed selected by selectively hydraulically operating a plurality of friction apply elements, before outputting it. In order to reduce the transmission of creep torque generated by the fluid power transmitting device while a stopped vehicle is maintained in a braked state, the creep prevention device places a friction apply element, from among the plurality of friction apply elements, which is applied for take-off when the vehicle is stopped, in a slip state by reducing the hydraulic fluid pressure of that friction apply element. The creep prevention device also hydraulically operates a friction apply element, from among the plurality of friction apply elements, capable of holding a vehicle on a hill. The application of this friction apply element prevents the output shaft of the transmission from rotating when creep prevention control is being executed. This creep prevention device is structured so as to increase the hydraulic fluid pressure of the friction apply element for take-off at a predetermined gradient when the creep prevention control is to be cancelled by a brake of the vehicle being released from an applied state. The predetermined gradient is set such that the period of time necessary for reapplying the friction apply element (i.e., the time that it takes for the friction apply element to be completely applied from a slip state) is maintained at an appropriate period of time.

The creep prevention device disclosed in JP(A) 10-196782 places the friction apply element in a slip state by reducing the hydraulic fluid pressure of the friction apply element, from among the plurality of friction apply elements, which is applied for take-off when the vehicle is stopped, when reducing the transmission of creep torque generated by the fluid power transmitting device while the vehicle is stopped with the brake applied. At the same time, the creep prevention device also has a hill hold function which prevents the vehicle from moving while in the creep prevention state on a hill. This function is achieved by the device hydraulically operating a friction apply element, from among the plurality of friction apply elements, capable of holding a vehicle on a hill, which prevents the output shaft of the transmission from rotating. When the creep prevention control is to be cancelled by a brake of the vehicle being released from an applied state, the hydraulic fluid pressure of the friction apply element for take-off is increased at a predetermined gradient. The predetermined gradient is set such that the period of time necessary for reapplying the friction apply element (i.e., the time that it takes for the friction apply element to be completely applied from a slip state) is maintained at an appropriate period of time. As a result, even if there is dispersion in the coefficient of friction of the friction apply element for take-off or if that coefficient of friction changes over time, the period of time required for reapplying that friction apply element (i.e., the time that it takes for the friction apply element to be completely applied from a slip state) is able to be reliably maintained at an appropriate period of time. Accordingly, the possibility of a large shock being generated due to the friction apply element for take-off being reapplied too quickly is able to be eliminated. At the same time, it is also possible to avoid a delay in the completion of reapplication of the friction apply element for take-off and the release of the friction apply element capable of holding a vehicle on a hill before that reapplication is complete, which would result in the shock generated by the reapplication of the friction apply element for take-off being transmitted directly to the wheels, or in the hill hold function being unable to be replaced by the use of creep torque.

When the neutral control is cancelled using the creep prevention device disclosed in JP(A) 10-196782, application of the friction apply element for take-off (i.e., cancellation of the neutral control) can be reliably completed after the appropriate period of time has passed. However, because the appropriate period of time corresponds to dispersion in the coefficient of friction of the friction apply element for take-off and the like, this is nothing more than determining completion of cancellation of the neutral control (i.e., reapplication of the friction apply element for take-off) based on the engine speed and the temperature of the hydraulic fluid of the automatic transmission. That is, the technology disclosed in the foregoing publication does not determine the completion timing of the cancellation of the neutral control taking into account any factors indicative of the state of the vehicle other than those mentioned above (i.e., the engine speed and the temperature of the hydraulic fluid in the automatic transmission).

SUMMARY OF THE INVENTION

In view of the foregoing problems, this invention thus provides a take-off control apparatus and method for a vehicle, capable of accurately determining cancellation of neutral control, when the neutral control is to be cancelled, according to a braking state or a running state of the vehicle.

One aspect of the invention relates to a take-off control apparatus and method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. This take-off control apparatus and method detects a braking state of the vehicle, and determines completion of cancellation of the neutral control based on the detected braking state.

This take-off control apparatus and method determines, based on the braking state of the vehicle when the neutral control is cancelled, for example, cancellation of the neutral control to be later the greater a braking force of the braking state, and earlier the less the braking force of the braking state. That is, when neutral cancellation control is executed while the vehicle brake is on, the sensation of the vehicle and the torque ratio when the clutch for take-off is applied are different than when neutral cancellation control is executed while the vehicle brake is off. Therefore, by making the determination of cancellation of the neutral control different depending on the braking state of the vehicle, it is possible to avoid shock from being generated when the neutral control is cancelled. As a result, it is possible to accurately determine the completion of cancellation of the neutral control, when the neutral control is to be cancelled, according to the braking state of the vehicle.

Another aspect of this invention relates to a take-off control apparatus and method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. This take-off control apparatus and method detects a moving state of the vehicle, and determines the completion of cancellation of the neutral control based on the detected moving state.

This take-off control apparatus and method determines, based on the moving state of the vehicle when the neutral control is cancelled, for example, cancellation of the neutral control to be later the less the vehicle is moving (i.e., when the braking force of the braking state is great and the vehicle speed is zero or extremely low), and determines cancellation of the neutral control to be earlier the more the vehicle is moving. That is, during the process of canceling the neutral control, the vehicle starts to move by the creep force if the brake is not applied, such that it is determined that the neutral control has been cancelled and normal control is executed. Therefore, by making the determination of cancellation of the neutral control depending on the moving state of the vehicle, it is possible to improve take-off ability after cancellation of the neutral control. As a result, during cancellation of neutral control, cancellation of the neutral control can be accurately determined according to the moving state of the vehicle.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which:

FIG. 2 is a clutch and brake application chart for the automatic transmission shown in FIG. 1;

FIGS. 6A, 6B, 6C, 6D, 6E, 6F, 6G are timing charts showing the operation of a vehicle equipped with an automatic transmission according to the exemplary embodiment of the invention.

DETAILED DESCRIPTION OF THE PREFERRED EMBODIMENTS

In the following description and the accompanying drawings, the present invention will be described in more detail with reference to exemplary embodiments.

A power train of a vehicle including a control apparatus according to one exemplary embodiment of this invention is as follows. The control apparatus according to this exemplary embodiment is realized by an ECU (Electronic Control Unit) 1000 shown in FIG. 1. The automatic transmission described in this exemplary embodiment is an automatic transmission that is provided with a torque converter, which acts as a fluid coupling, and a planetary gear type gear change mechanism. It should be noted, however, that this invention is not limited to an automatic transmission having a planetary gear type gear change mechanism. That is, the automatic transmission may also be, for example, a continuously variable transmission such as a belt type continuously variable transmission.

Figure 1:
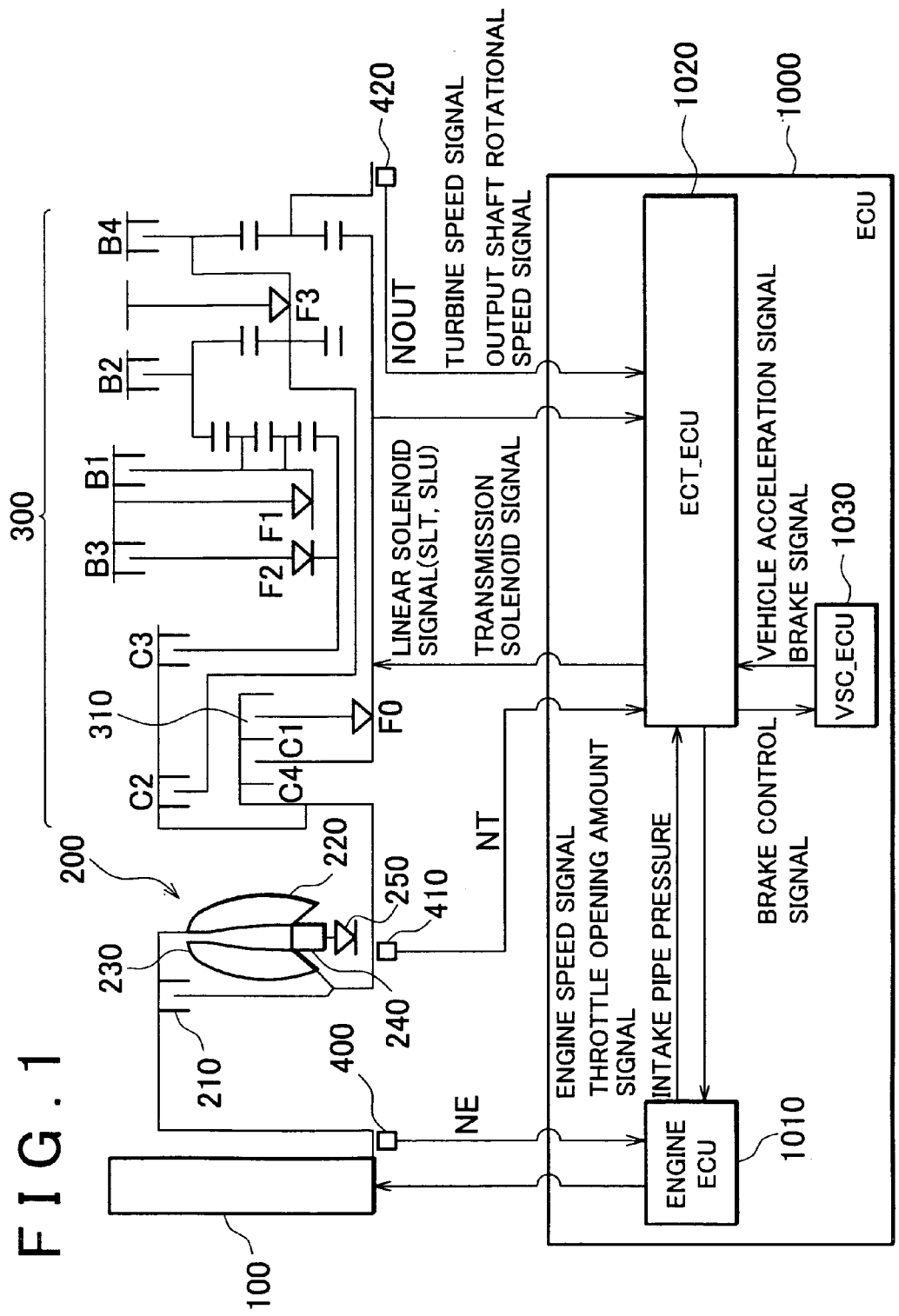
FIG. 1 is a control block diagram of an automatic transmission according to one exemplary embodiment of the invention.

The power train of a vehicle including a control apparatus according to one exemplary embodiment of this invention will be described with reference to FIG. 1. The control apparatus according to this exemplary embodiment is more specifically realized by an ECT (Electronically Controlled Automatic Transmission)_ECU 1020 shown in FIG. 1.

Referring to the drawing, the power train of the vehicle includes i) an engine 100, ii) an automatic transmission having a torque converter 200 and a planetary gear type gear change mechanism 300, and iii) the ECU 1000.

An output shaft of the engine 100 is connected to an input shaft of the torque converter 200. The engine 100 is coupled to the torque converter 200 via a rotating shaft. Therefore, an input shaft rotational speed (i.e., pump speed) of the torque converter 200 is the same as an output shaft rotational speed NE (i.e., engine speed NE) of the engine 100 detected by an engine speed sensor 400.

The torque converter 200 includes a lockup clutch 210 that locks the input shaft and the output shaft together, a pump impeller 220 on the input shaft side, a turbine runner 230 on the output shaft side, and a stator 240 used to increase torque, which has a one-way clutch 250. The torque converter 200 and the planetary gear type gear change mechanism 300 are connected via a rotating shaft. An output shaft rotational speed NT of the torque converter 200 (i.e., the turbine speed NT) is detected by a turbine speed sensor 410. An output shaft rotational speed NOUT of the planetary gear type gear change mechanism 300 is detected by an output shaft rotational speed sensor 420.

FIG. 2 is a clutch and brake application chart for the planetary gear type gear change mechanism 300. More specifically, this chart shows which of the friction elements, i.e., clutch elements (C1 to C4 in the drawing), brake elements (B1 to B4), and one-way clutch elements (F0 to F3), are applied or released for each speed. In first speed, which is used when the vehicle starts from a standstill, the clutch element (C1) and the one-way clutch elements (F0 and F3) are applied. The clutch element C1, in particular, from among the clutch elements is referred to as an input clutch 310. This input clutch (C1) 310 is also referred to as a forward clutch, and is always applied when the transmission is in a speed to drive the vehicle forward when the shift lever is in a position other than the park (P) position, the reverse (R) position, or the neutral (N) position, as shown in the chart in FIG. 2.

When it has been determined that the shift lever is in the drive (D) position and the vehicle is stopped by predetermined conditions being satisfied (e.g., the accelerator is off, the brake is on, the brake master cylinder pressure is equal to, or greater than, a predetermined value, and the vehicle speed is equal to, or less than, a predetermined value), so-called neutral control is performed in which the input clutch (C1) 310 is released and put into a predetermined slip state, thereby placing the transmission in a neutral-like state.

The ECU 1000 that controls the power train includes an engine ECU 1010 that controls the engine 100, the ECT (Electronically Controlled Automatic Transmission)_ECU 1020 that controls the planetary gear type gear change mechanism 300, and a VSC (Vehicle Stability Control)_ECU 1030.

The ECT_ECU 1020 receives a signal indicative of the turbine speed NT from the turbine speed sensor 410 and a signal indicative of the output shaft rotational speed NOUT from the output shaft rotational speed sensor 420. The ECT_ECU 1020 also receives a signal indicative of the engine speed NE detected by the engine speed sensor 400 and a signal indicative of a throttle opening amount detected by a throttle position sensor, both of which are output by the engine ECU 1010.

These rotational speed sensors are disposed facing teeth of rotation detecting gears mounted on the input shaft of the torque converter 200, the output shaft of the torque converter 200, and the output shaft of the planetary gear type gear change mechanism 300. These rotational speed sensors are capable of detecting even slight rotation of the input shaft of the torque converter 200, the output shaft of the torque converter 200, and the output shaft of the planetary gear type gear change mechanism 300. These sensors may be sensors which use, for example, magnetic resistance elements, generally referred to as semiconductor sensors.

Further, a signal indicative of the vehicle acceleration detected by a G sensor, as well as a signal indicating whether the brake is on, are output from the VSC_ECU 1030 to the ECT_ECU 1020. The VSC_ECU 1030 receives a brake control signal from the ECT_ECU 1020 and controls the brakes of the vehicle by controlling the brake hydraulic pressure circuit.

Figure 3:
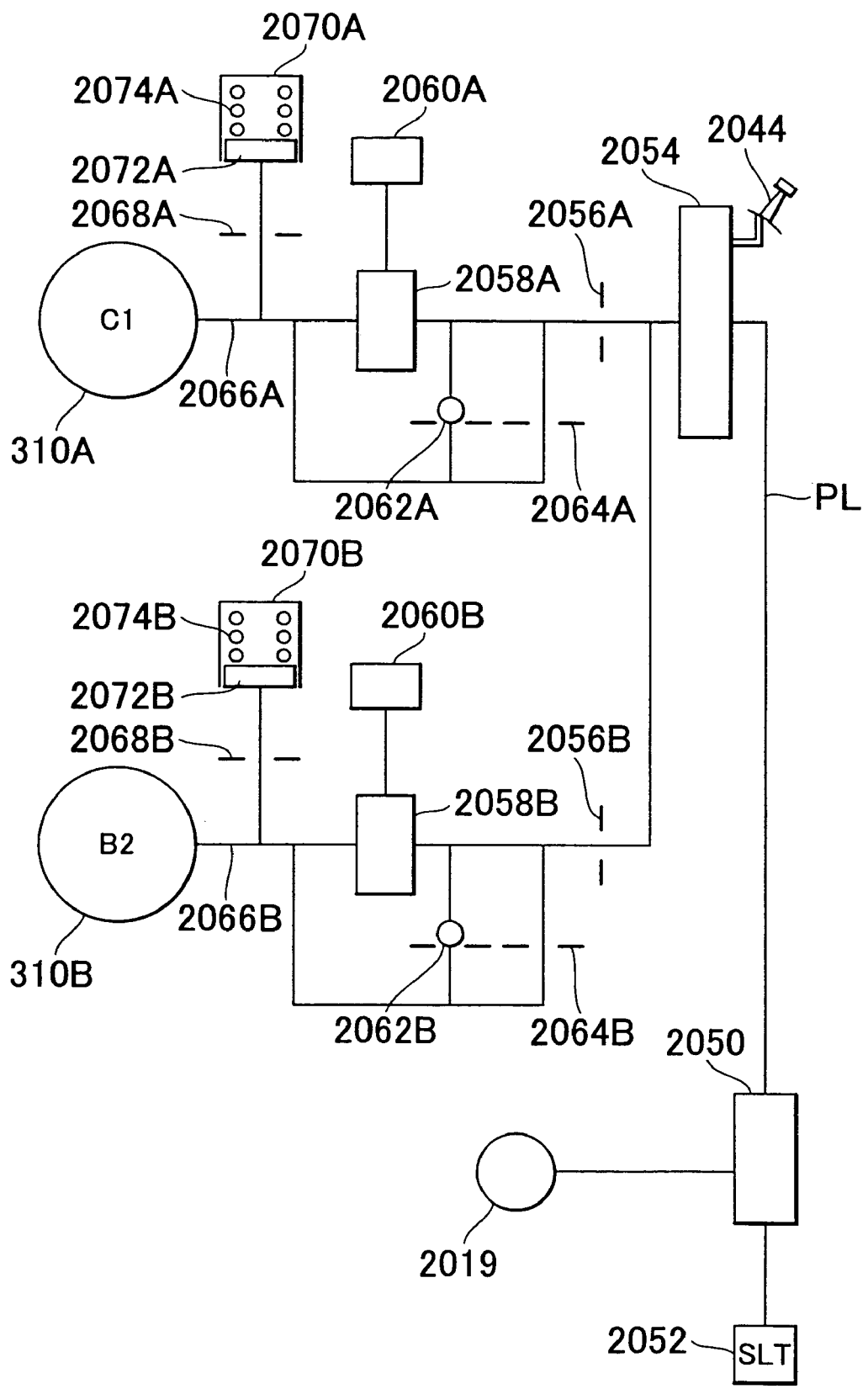
FIG. 3 is a view of a hydraulic pressure circuit for the automatic transmission.

The hydraulic pressure circuit used to apply the input clutch (C1) 310A and the brake (B2) 310B in the hydraulic pressure control apparatus of the planetary gear type gear change mechanism 300 will now be explained with reference to FIG. 3.

A primary regulator valve 2050 is controlled by a line pressure control solenoid 2052 so as to regulate a base pressure generated by an oil pump 2019 to a line pressure PL. This line pressure PL is introduced to a manual valve 2054. The manual valve 2054 is mechanically connected to a shift lever 2044 and allows the line pressure PL to flow to the input clutch (C1) 310A side when the shift lever is in a forward drive position such as the drive (D) position or manual 1st, 2nd, etc. position. The manual valve 2054 also allows the line pressure PL to flow to the brake (B2) 310B side when the shift lever is in a position such as 2nd and the engine brake is applied.

A large orifice 2056A and a switch valve 2058A are provided between the manual valve 2054 and the input clutch (C1) 310A. The switch valve 2058A is controlled by a solenoid 2060A to selectively allow or prevent the flow of oil that has passed through the large orifice 2056A to the input clutch (C1) 310A.

A check ball 2062A and a small orifice 2064A are provided in parallel so as to bypass the switch valve 2058A. When the switch valve 2058A is closed by the solenoid 2060A, the oil that has passed through the large orifice 2056A flows to the input clutch (C1) 310A through the small orifice 2064A. The check ball 2062A helps the hydraulic pressure to drain smoothly from the input clutch (C1) 310A when it is drained.

An accumulator 2070A is connected, via an orifice 2068A, to an oil passage 2066A extending between the switch valve 2058A and the input clutch (C1) 310A. This accumulator 2070A includes a piston 2072A and a spring 2074A, and serves to temporarily maintain oil at a predetermined oil pressure determined by the spring 2074A when it is supplied to the input clutch (C1) 310A, as well as to reduce shock generated when the input clutch (C1) 310A is applied.

An oil passage extends from between the manual valve 2054 and the large orifice 2056A to the brake (B2) 310B side. The structure of the brake (B2) 310B side is similar to that of the input clutch (C1) 310A side. That is, a large orifice 2056B and a switch valve 2058B are provided between the manual valve 2054 and the brake (B2) 310B. The switch valve 2058B is controlled by a solenoid 2060B to selectively allow or prevent the flow of oil that has passed through the large orifice 2056B to the brake (B2) 310B.

A check ball 2062B and a small orifice 2064B are provided in parallel so as to bypass the switch valve 2058B. When the switch valve 2058B is closed by the solenoid 2060B, the oil that has passed through the large orifice 2056B flows to the brake (B2) 310B through the small orifice 2064B. The check ball 2062B helps the hydraulic pressure to drain smoothly from the brake (B2) 310B when it is drained.

An accumulator 2070B is connected, via an orifice 2068B, to an oil passage 2066B extending between the switch valve 2058B and the brake (B2) 310B. This accumulator 2070B includes a piston 2072B and a spring 2074B, and serves to temporarily maintain oil at a predetermined oil pressure determined by the spring 2074B when it is supplied to the brake (B2) 310B, as well as to reduce shock generated when the brake (B2) 310B is applied.

The structure of the brake for holding the vehicle still will now be described with reference to FIG. 4.

Figure 4:
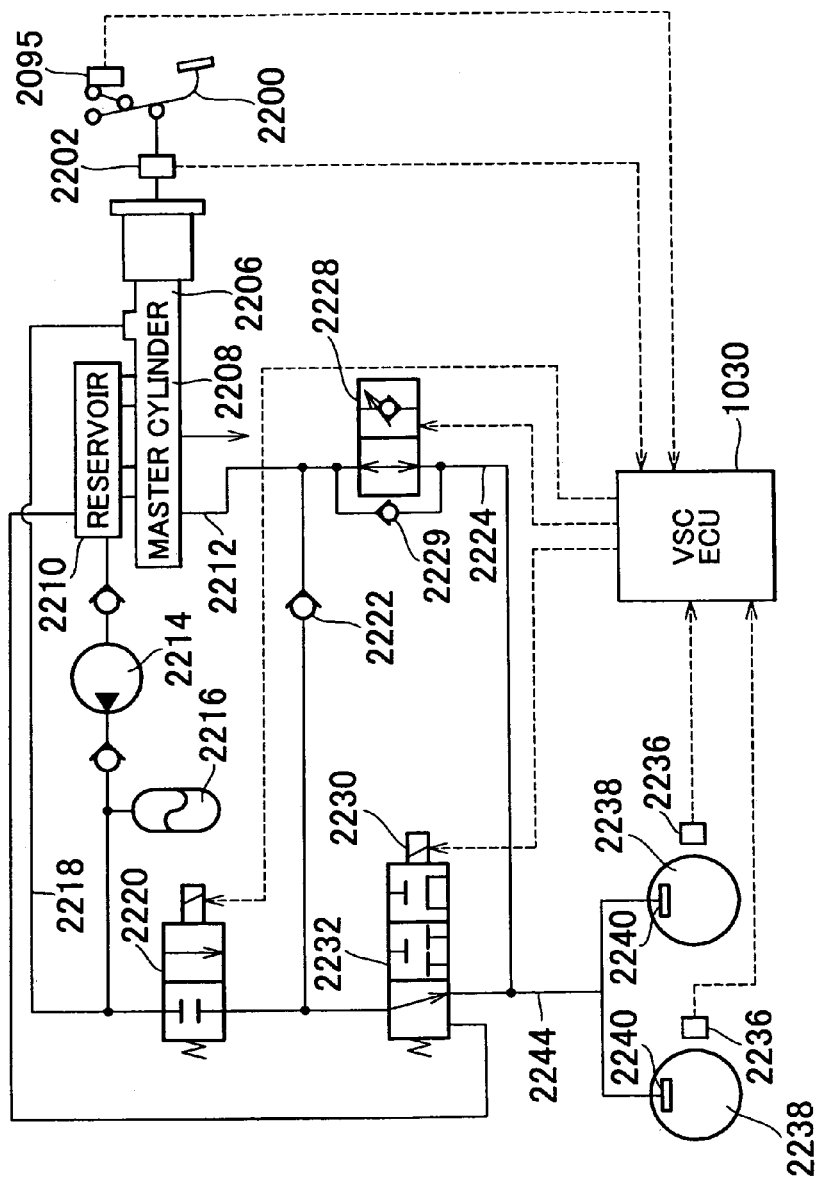
FIG. 4 is a view of a hydraulic pressure circuit for a brake of a vehicle.

In FIG. 4, a brake pedal 2200 is a brake operating member which is operated by a driver of the vehicle. This brake pedal 2200 operates a master cylinder 2208 via a hydraulic pressure booster 2206. A reservoir 2210 is provided above the master cylinder 2208. A pump 2214 draws out brake fluid from the reservoir 2210 and sends it to an accumulator 2216 where it is stored at high pressure. The hydraulic pressure booster 2206 is connected to the accumulator 2216 via a fluid passage 2218.

A pressure chamber, not shown, in the master cylinder 2208 is connected, via fluid passages 2212 and 2244, which together serve as a main fluid passage, to a wheel cylinder of a brake for braking a front wheel 2238. Meanwhile, another pressure chamber (also not shown) is connected to a wheel cylinder of a brake for braking a rear wheel. Because the structure of the rear wheel system is the same as that of the front wheel system, only the front wheel system will be described. A separate explanation and separate drawings for the rear wheel system will not be provided.

A check valve 2222 and an electromagnetic pressure increase/decrease valve 2232 are provided in the fluid passage 2212. The electromagnetic pressure increase/decrease valve 2232 is a three position electromagnetic valve. That is, the electromagnetic pressure increase/decrease valve 2232 is normally in a position which allows the flow of brake fluid between the fluid passage 2212 and the fluid passage 2244, i.e., in a position that allows the flow of brake fluid between the master cylinder 2208 and the wheel cylinder 2240, thereby allowing a pressure increase. However, by supplying a medium electric current to a solenoid 2230, the electromagnetic pressure increase/decrease valve 2232 can also be switched to a position which prevents the flow of brake fluid between the master cylinder 2208 and the wheel cylinder 2240, thereby maintaining the pressure. Further, by supplying a large electric current to the solenoid 2230, the electromagnetic pressure increase/decrease valve 2232 can be switched to a position which allows the flow of brake fluid from the wheel cylinder 2240 to the reservoir 2210, thereby allowing a pressure decrease.

A bypass passage 2224 is provided which bypasses the electromagnetic pressure increase/decrease valve 2232 so that brake fluid in the wheel cylinder 2240 can circulate back to the master cylinder 2208 via the bypass passage 2224.

A linear valve 2228 is provided in the bypass passage 2224 between the master cylinder 2208 and the wheel cylinder 2240. This linear valve 2228 serves to keep brake fluid in the wheel cylinder 2240 when the brake is applied. This linear valve 2228 is not limited simply to two-way ON/OFF control. Rather, the amount of opening and closing of the valve can be appropriately controlled and changed linearly.

As will be described later, providing this linear valve 2228 enables brake fluid pressure to be released gradually even if the brake pedal 2200 is released suddenly. That is, according to this exemplary embodiment, the timing at which the braking force is reduced, as well as the amount of braking force, is controlled by controlling the linear valve 2228.

A pressure valve 2229, which is capable of pressurizing the wheel cylinder 2240, is provided so as to bypass the linear valve 2228 to prevent a decrease in braking force due to a decrease in brake fluid pressure while the brake fluid pressure is being maintained.

The accumulator 2216 is connected, via an electromagnetic check valve 2220, to the portion of the fluid passage 2212 after the check valve 2222. This electromagnetic check valve 2220 is normally closed to prevent the flow of brake fluid between the accumulator 2216 and the fluid passage 2212, but opens simultaneously with the start of operation of the electromagnetic pressure increase/decrease valve 2232 so that high pressure brake fluid is supplied from the accumulator 2216 to the electromagnetic pressure increase/decrease valve 2232. The check valve 2222 prevents the high pressure brake fluid supplied from the accumulator 2216 from flowing into the master cylinder 2208.

A rotational speed sensor 2236 detects a rotational speed of the front wheel 2238. A brake switch 2095 detects depression of the brake pedal 2200. A load cell 2202 detects the operating force on the brake pedal 2200. The VSC_ECU 1030 outputs control signals to the electromagnetic pressure increase/decrease valve 2232, the linear valve 2228, and the electromagnetic check valve 2220 based on signals such as those from the rotational speed sensor 2236 and the brake switch 2095 and the brake control signal from the ECT_ECU 1020, to control the hydraulic pressure of the wheel cylinder 2240, i.e., the braking force of the wheel.

Figure 5:
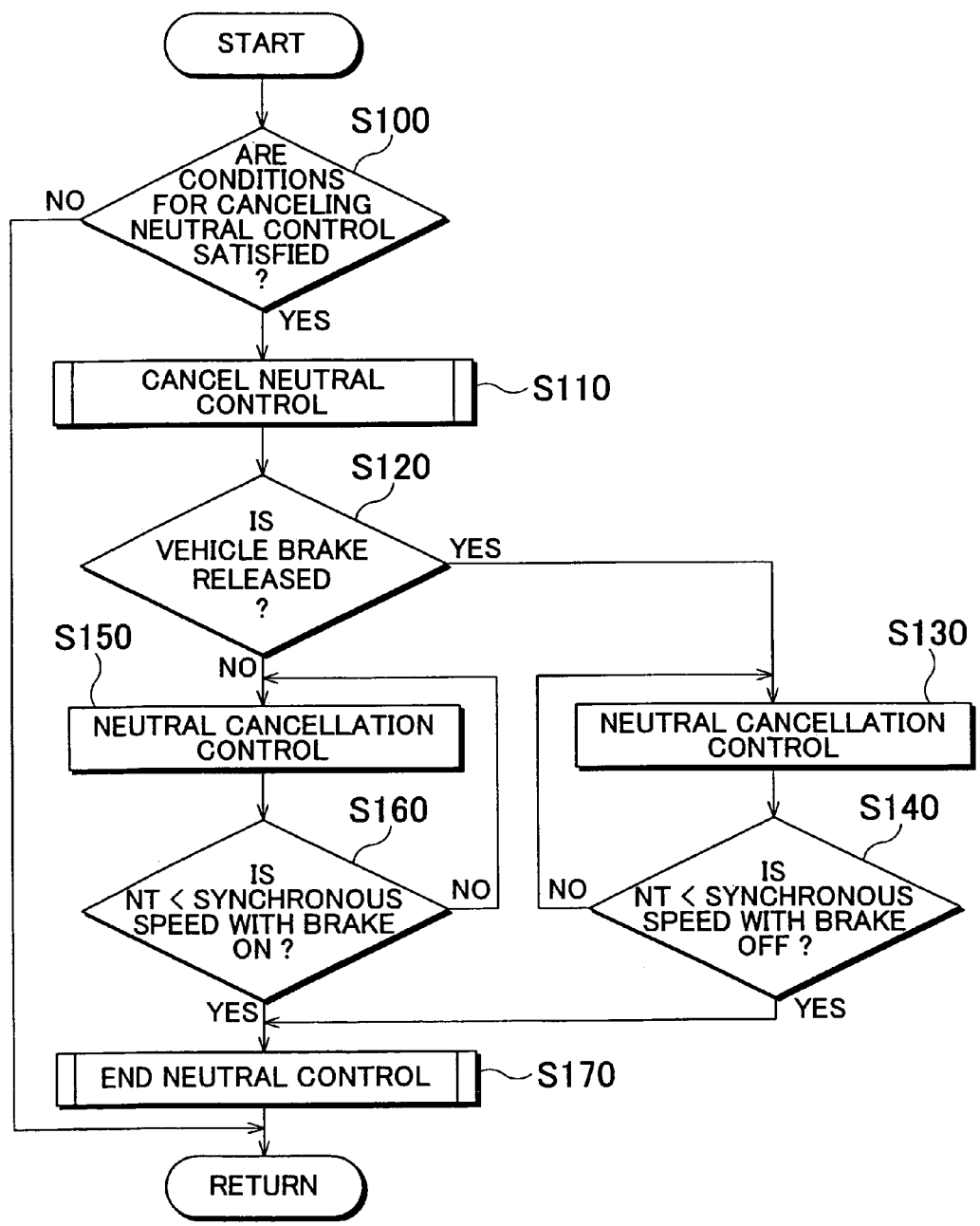
FIG. 5 is a flowchart showing the control structure of a program executed by an ECU according to the exemplary embodiment of the invention.

The control structure of the program executed by the ECT_ECU 1020, which relates to the control apparatus according to this exemplary embodiment of the invention, will now be described with reference to FIG. 5.

In step S100, the ECT_ECU 1020 determines whether conditions for canceling the neutral control are satisfied. This determination is made based on various signals input to the ECT_ECU 1020. Examples of these conditions include a brake master cylinder pressure being less than a set value, an amount of change in the brake master cylinder pressure being greater than a set value, a throttle opening amount being greater than a set value, the duration of neutral control being greater than a set value, a failure being detected or manual operation being detected (i.e., forced cancellation of the neutral control). If these conditions for canceling the neutral control are satisfied (i.e., YES instep S100), the routine proceeds on to step S110. If not, (i.e., NO instep S110), the routine ends.

In step S110, the ECT_ECU 1020 starts the process to cancel the neutral control. In step S120, the ECT_ECU 1020 determines whether the vehicle brake is released. This determination is made based on the brake master cylinder pressure and the brake switch signal. If the vehicle brake is released (i.e., YES in step S120), the routine proceeds on to step S130. If not, (i.e., NO in step S120), the routine proceeds on to step S150.

In step S130, the ECT_ECU 1020 starts to cancel the neutral control. More specifically, the ECT_ECU 1020 executes neutral cancellation control by controlling the hydraulic pressure supplied to the input clutch (C1) 310 using the hydraulic pressure circuit shown in FIG. 3.

In step S140, the ECT_ECU 1020 determines whether the turbine speed NT is less than the synchronous speed when the brake is off. The synchronous speed when the brake is off is set in advance and stored in memory. The synchronous speed when the brake is off is set higher than the synchronous speed when the brake is on, which will be described later. If the turbine speed NT is less than the synchronous speed when the brake is off (i.e., YES in step S140), the routine proceeds on to step S170. If not, (i.e., NO in step S140), the routine returns to step S130 and the neutral cancellation control continues to be executed.

In step S150, the ECT_ECU 1020 starts to cancel the neutral control. The process in step S150 is the same as that in step S130 described above.

In step S160, the ECT_ECU 1020 determines whether the turbine speed NT is less than the synchronous speed when the brake is on. The synchronous speed when the brake is on is set in advance and stored in memory. The synchronous speed when the brake is on is set lower than the synchronous speed when the brake is off, described above. If the turbine speed NT is less than the synchronous speed when the brake is on (i.e., YES in step S160), the routine proceeds on to step S170. If not, (i.e., NO in step S160), the routine returns to step S150 and the neutral cancellation control continues to be executed.

In step S170, the ECT_ECU 1020 ends execution of the neutral control.

The speed ratio or a speed which is calculated by turbine speed NT–output shaft speed NOUT×gear ratio may be used in place of the turbine speed NT in steps S140 and S160.

The operation of the vehicle equipped with the ECT_ECU, which relates to the control apparatus according to this exemplary embodiment, will now be described based on the foregoing structure and flowchart. The timing chart shown in FIG. 6 will also used in the explanation of this operation.

If the brake is not applied during neutral cancellation control (step S110) (i.e., the vehicle brake is released; YES in step S120), the turbine speed NT changes in the manner shown by the solid line in FIG. 6D. This is because the vehicle starts to move as shown in FIG. 6E by the creep force generated as the input clutch (C1) 310 of the vehicle is applied, due to the fact that the brake is not applied.

Because the synchronous speed when the brake is off is set higher than the synchronous speed when the brake is on, it is determined that cancellation of the neutral control was completed earlier (FIG. 6D).

As a result, the neutral cancellation control is ended and the shift to normal running control is made earlier, thereby improving take-off performance.

If the brake is applied during neutral cancellation control (step S110) (i.e., the vehicle brake is not released; NO in step S120), the turbine speed NT changes in the manner shown by the broken line in FIG. 6D. This is because the vehicle does not start to move, as shown in FIG. 6E, even if creep force is generated as the input clutch (C1) 310 of the vehicle is applied, due to the fact that the brake is applied.

Because the synchronous speed when the brake is on is set lower than the synchronous speed when the brake is off, it is determined that cancellation of the neutral control was completed later (FIG. 6D).

As a result, the generation of shock due to application of the input clutch (C1) 310 during neutral cancellation control can be reduced, thereby improving drivability.

In this manner, the control apparatus according to this exemplary embodiment sets the synchronous speed when the brake is on and the synchronous speed when the brake is off, which are both used for determining cancellation of the neutral control, separately based on the state of the brake during cancellation of the neutral control. The synchronous speed of the turbine speed is set low when the brake is on and high when the brake is off.

Accordingly, completion of cancellation of the neutral control (i.e., ending of the neutral control) is determined differently depending on the braking state of the vehicle, thereby enabling shock due to application of the input clutch C1 to be suppressed and take-off performance to be improved. As a result, cancellation of the neutral control can be determined based on the braking state of the vehicle executing neutral control, such that cancellation of the neutral control can be achieved smoothly.

In the exemplary embodiment, the synchronous speed of the turbine speed NT may also be set according to the degree of brake operation.

Also, the determination of completion of cancellation of the neutral control may also be made based not on the operating state (i.e., the degree of operation) of the brake, but rather on the moving state of the vehicle. At this time, the moving speed of the vehicle (i.e., the vehicle speed) may be detected based on a signal detected by the output shaft rotational speed sensor 420 of the planetary gear type gear change mechanism 300. The synchronous speed of the turbine speed NT may be set according to the degree of movement of the vehicle.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A take-off control apparatus for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied, the take-off control apparatus comprising:

a controller which detects a braking state of the vehicle, and determines completion of cancellation of the neutral control during the neutral cancellation control based on the detected braking state, and which finishes cancellation of the neutral control if completion of cancellation of the neutral control is determined.

2. The take-off control apparatus according to claim 1, wherein the controller determines the completion of cancellation of the neutral control to be later the greater the braking force of the detected braking state.

3. The take-off control apparatus according to claim 2, wherein the controller detects the braking state based on a brake switch of the vehicle.

4. The take-off control apparatus according to claim 1, wherein the controller detects the braking state based on a brake switch of the vehicle.

5. The take-off control apparatus according to claim 1, wherein the controller detects a turbine speed of a torque converter provided in the automatic transmission, and determines completion of cancellation of the neutral control based on the turbine speed and a speed set corresponding to the braking state.

6. The take-off control apparatus according to claim 1, wherein the controller sets a condition to determine completion of cancellation of the neutral control, based on the braking state, and the controller determines completion of cancellation of the neutral control in response to that condition being satisfied.

7. The take-off control apparatus according to claim 6, wherein the condition is that a turbine speed of a torque converter is less than a reference value, and the controller changes the reference value based on the braking state.

8. A take-off control apparatus for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied, the take-off control apparatus comprising:
   a controller that detects a moving state of the vehicle, and determines completion of cancellation of the neutral control during the neutral cancellation control based on the detected moving state, and which finishes cancellation of the neutral control if completion of cancellation of the neutral control is determined.

9. The take-off control apparatus according to claim 8, wherein the controller determines the completion of cancellation of the neutral control to be later the slower the moving state detected by the detecting means.

10. The take-off control apparatus according to claim 9, wherein the controller detects the moving state of the vehicle based on a rotational speed of an output shaft of the automatic transmission.

11. The take-off control apparatus according to claim 8, wherein the controller detects the moving state of the vehicle based on a rotational speed of an output shaft of the automatic transmission.

12. The take-off control apparatus according to claim 8, wherein the controller detects a turbine speed of a torque converter provided in the automatic transmission, and determines the completion of cancellation of the neutral control based on the turbine speed and a speed set corresponding to the moving state of the vehicle.

13. The take-off control apparatus according to claim 8, wherein the controller sets a condition to determine completion of cancellation of the neutral control, based on the moving state, and the controller determines completion of cancellation of the neutral control in response to that condition being satisfied.

14. The take-off control apparatus according to claim 13, wherein the condition is that a turbine speed of a torque converter is less than a reference value, and the controller changes the reference value based on the moving state.

15. A take-off control method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied, the take-off control method comprising the steps of:
   detecting a braking state of the vehicle;
   determining completion of cancellation of the neutral control based on the detected braking state during the neutral cancellation control; and
   finishing cancellation of the neutral control if completion of cancellation of the neutral control is determined.

16. The take-off control method according to claim 15, wherein the completion of cancellation of the neutral control is determined to be later the greater a braking force of the detected braking state.

17. The take-off control method according to claim 16, wherein the braking state is detected based on a brake switch of the vehicle.

18. The take-off control method according to claim 15, wherein the braking state is detected based on a brake switch of the vehicle.

19. The take-off control method according to claim 15, further comprising the steps of:
   detecting a turbine speed of a torque converter provided in the automatic transmission; and
   determining completion of cancellation of the neutral control based on the turbine speed and a speed set corresponding to the braking state.

20. The take-off control method according to claim 15, wherein determining completion of cancellation of the neutral control based on the detected braking state during the neutral cancellation control includes:
   setting a condition to determine the completion of cancellation of the neutral control, based on the braking state; and
   determining the completion of cancellation of the neutral control in response to that condition being satisfied.

21. The take-off control method according to claim 20, wherein the condition is that a turbine speed of a torque converter is less than a reference value, the reference value being changed based on the braking state.

22. A take-off control method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied, the take-off control method comprising the steps of:
   detecting a moving state of the vehicle;
   determining completion of cancellation of the neutral control based on the detected moving state during the neutral cancellation control; and
   finishing cancellation of the neutral control if completion of the neutral control is determined.

23. The take-off control method according to claim 22, wherein the completion of cancellation of the neutral control is determined to be later the slower the moving state detected by the detecting means.

24. The take-off control method according to claim 23, wherein the moving state of the vehicle is detected based on a rotational speed of an output shaft of the automatic transmission.

25. The take-off control apparatus method to claim 22, wherein the moving state of the vehicle is detected based on a rotational speed of an output shaft of the automatic transmission.

26. The take-off control method according to claim 22, further comprising the steps of:
  detecting a turbine speed of a torque converter provided in the automatic transmission; and
  determining the completion of cancellation of the neutral control based on the turbine speed and a speed set corresponding to the moving state of the vehicle.

27. The take-off control method according to claim 22, wherein determining completion of cancellation of the neutral control based on the detected moving state during the neutral cancellation control includes:
  setting a condition to determine the completion of cancellation of the neutral control, based on the moving state; and
  determining the completion of cancellation of the neutral control in response to that condition being satisfied.

28. The take-off control method according to claim 27, wherein the condition is that a turbine speed of a torque converter is less than a reference value, the reference value being changed based on the moving state.

* * * * *